Patented Apr. 25, 1933

1,905,798

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

MERCAPTO ARYL THIAZOLES AND METHOD OF MAKING THEM

No Drawing. Application filed March 2, 1928. Serial No. 258,682.

This invention relates to a new class of chemical products and to methods of making them.

The invention consists in treating a solution of a thiol acid with a solution of a halide of an organic group to produce new compounds containing the group $$\overset{RCSY}{\underset{X}{\parallel}}$$

The invention includes the new products thus obtained. In $$\overset{RCSY}{\underset{X}{\parallel}},$$

R represents sulphur; X represents a trivalent element as in the case of a thiazole Y is a substituted aryl or methyl group having a carbon atom thereof directly attached to the sulphur of the original sulfhydryl group. The mercapto thiazoles afford an example in which the R and X are parts of a ring.

As illustrations of Y the following are given:—2-4 dinitrophenyl, 2-6 dinitro 4 chloro phenyl, 2-4-6 trinitro phenyl (picryl) etc., diphenyl methyl, triphenyl methyl, phenyl methylene (benzal), trimethyl methyl (tertiary butyl), phenyl chlor methylene, phthalimidomethyl, diiodomethyl, allyl etc. In the examples of poly nitro phenyl groups it will be observed that there is at least one nitro group ortho to the 1-position, and that at least one of the remaining substituents is meta to the aforesaid nitro group. In the dinitro phenyl groups, the two nitro groups are meta to each other, and at least one of them is ortho to the 1-position.

All of the compounds disclosed herein may be prepared according to the same general procedure, namely treating a solution of a salt (preferably the sodium salt) of the thiazol, with a solution of the chloride of Y. For example a solution of sodium salt of mercaptobenzothiazole may be treated with a solution of 2-4 dinitro chlor benzol or of benzal chloride.

In further illustration 2-4 dinitrophenyl benzothiazyl sulphide may be prepared as follows:

40 grams of sodium hydroxide are dissolved in 500 grams of water and 168 grams of mercapto benzothiazole and 500 cc. of 95% alcohol are added. The mixture is heated to 50–60° C. until all the mercapto benzothiazole has dissolved. 202 grams of dinitrochlorbenzol are then added and the mixture heated under a reflux condenser until the dinitrochlorbenzol has disappeared. The mixture is then cooled and the 2-4 dinitrophenyl benzothiazyl sulphide which precipitates out is removed by filtration, washed free of sodium chloride, dried and ground. The melting point should be 156–157° C. On further purification the melting point is 162½° C. It is a yellow material crystallizing in prisms that melt at 162½° C. uncorrected. The body is insoluble in water and practically insoluble in cold alcohol. It is fairly soluble in hot alcohol, quite soluble in warm benzol and fairly soluble even in cold benzol. It is soluble in cold acetone. Its alcoholic solution hydrolyzes in the presence of alkali. The probable formula is

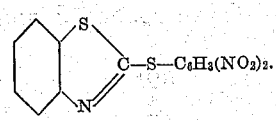

Another example of this class of compounds is 2, 4, 6 trinitrophenyl benzothiazyl sulphide. It may be prepared as follows:

168 grams of mercapto benzothiazole are dissolved in 500 cc. of alcohol and 500 cc. of water by means of 40 grams of sodium hydroxide. The solution then contains the sodium salt of mercapto benzothiazole. To this solution are added 247½ grams of 1 chloro 2, 4, 6 trinitrobenzene. The reaction mixture is then heated until the 1 chloro 2, 4, 6 trinitrobenzene has disappeared which will take about 3 hours. The reaction mixture is then cooled to room temperature whereupon the product, which is the 2, 4, 6 trinitrophenyl benzothiazyl sulphide crystallizes out. This is filtered from the reaction liquor, washed free from sodium chloride, and dried. It is a brick-red crystalline material melting after re-crystallization from alcohol at 152° C. uncorrected. It is soluble in benzol, insoluble in cold alcohol and only fairly soluble in hot alcohol. It is insoluble in water. The formula of this compound is believed to be

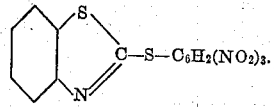

Another example of this class of compounds is 2, 6 dinitro 4 chlorophenyl benzothiazyl sulphide which may be prepared as follows:

168 grams of mercapto benzothiazole are dissolved in 500 cc. of alcohol and 500 cc. of water by means of the addition of 40 grams of sodium hydroxide. The solution then contains the sodium salt of mercapto benzothiazole. To this solution are added 237 grams of 2, 6 dinitro 1, 4 dichlorobenzol and the whole heated to 60–70° until all of the 2, 6 dinitro 1, 4 dichlorobenzol has disappeared. The reaction mixture is then cooled to room temperature whereupon the product which is the 2, 6 dinitro 4 chlorophenyl benzothiazylsulphide crystallizes out. This is filtered from the reaction mixture, washed free of sodium chloride and dried. This is a yellow body, soluble in benzol, quite soluble in hot alcohol and fairly soluble in cold alcohol. The melting point is 167° C. uncorrected. The formula is

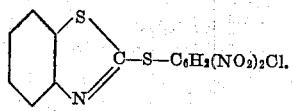

The allyl, diphenyl methyl, phenyl methylene and other derivatives of mercapto benzo thiazole may be similarly prepared. In all of this class of compounds R and X in the group

are sulphur and nitrogen respectively, and the group may be written

These compounds contain the group

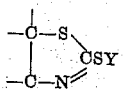

Other benzo thiazyl sulphides include: Allyl benzo thiazyl sulphide—B. P. 145–148° C., diphenylmethylbenzothiazyl sulphide—M. P. 108° C., phenyl methylene bis benzo thiazyl sulphide (M. P. 114° C.).

The new compounds are in general soluble in benzol, acetone and hot alcohol, slightly soluble in cold alcohol, and insoluble in water. All of the compounds described herein are of utility in the vulcanization of rubber.

Having thus described my invention, what I claim and desire to protect by Letters Patent is:

1. A method of making picryl benzo thiazyl sulphide which comprises treating an alcoholic solution of mercapto benzo thiazole and aqueous sodium hydroxide with chloro 2-4-6 trinitro benzene, heating until the reaction is complete, cooling, separating out the reaction product, and purifying it.

2. A process of preparing a thiazole derivative which comprises reacting an alkali salt of mercapto benzothiazole and a nitrochlorbenzene.

3. A process of preparing a thiazole derivative which comprises reacting an alkali salt of mercapto benzothiazole and dinitrochlorbenzene.

4. A process of preparing a thiazole derivative which comprises reacting an alkali metal salt of mercapto benzothiazole and a nitrochlorbenzene.

5. A process of preparing a thiazole derivative which comprises reacting the sodium salt of mercapto-benzothiazole and a nitrochlorbenzene.

6. As a new compound a benzothiazyl sulfid containing a di-substituted phenyl group attached to said sulfid grouping, at least one of said substituents comprising a nitro group.

7. As a new compound a benzo thiazole derivative containing the group

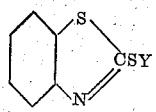

where Y represents a disubstituted aryl group containing a nitro substituent, said aryl group Y containing less than eight carbon atoms.

8. As a new compound, a derivative of mercapto benzo thiazole wherein a nitro substituted aryl group is attached to a sulphur atom of the thiazole, said aryl group containing less than eight carbon atoms and including only carbon, hydrogen, nitrogen and oxygen within its structure.

9. As a new compound, a derivative of mercapto benzo thiazole wherein a disubstituted benzene, one of which substituents is a nitro group, is attached to a sulfur atom of the thiazole, said substituted benzene containing less than eight carbon atoms and including only carbon, hydrogen, nitrogen and oxygen within its structure.

10. A method of making a nitro substituted aryl-benzo-thiazyl sulfid which comprises treating mercapto benzothiazole with a nitro substituted aryl halide, containing less than eight carbon atoms, separating the reaction product and purifying.

11. A method of making a nitro substituted aryl benzothiazyl sulfid which comprises reacting in the presence of an organic solvent mercapto benzothiazole, and alkali and a nitro substituted aryl halide containing less than eight carbon atoms, separating the reaction product and purifying.

12. A method of forming a nitro substituted aryl benzo thiazyl sulfid which comprises reacting in the presence of an organic solvent, an unsubstituted mercaptobenzothiazole, an alkali and a halogen nitro substituted benzene compound containing less than eight carbon atoms and separating the reaction product.

13. A method of forming a benzo thiazyl sulfid containing a substituted phenyl group attached to said sulfid grouping, which comprises reacting in the presence of an organic solvent, a mercaptobenzothiazole, an alkali and a di-substituted benzene containing less than eight carbon atoms, the latter containing a nitro group, and separating the reaction product.

14. As new compounds, mercapto aryl thiazoles of the formula

where R is an arylene group and Y is an aryl or methyl group which is substituted by at least one substituent having a negative character.

15. As new materials, mercapto aryl thiazoles wherein the sulphur of the original sulfhydryl group is directly attached, through substitution of the hydrogen of said last group, to a carbon atom in a substituted group comprising at least one single benzene nucleus, said last mentioned group comprising more than carbon and hydrogen.

16. As new materials, mercapto aryl thiazoles wherein the sulphur of the original sulfhydryl group is directly attached, through replacement of the hydrogen of said last group, to a carbon atom in a substituted aromatic group of the benzene series, said last mentioned group comprising more than carbon and hydrogen.

17. As new materials, mercapto aryl thiazoles wherein the sulphur of the original sulfhydryl group is directly attached, by replacement of the hydrogen of said last group, to a carbon atom in a substituted phenyl group, said last mentioned group comprising more than carbon and hydrogen.

18. As a new compound, an arylene thiazyl sulphide containing the group

where Y is a methyl group which is substituted by at least one substituent having a negative character.

19. As a new compound phenyl methylene bis benzo thiazyl sulphide having the probable general formula

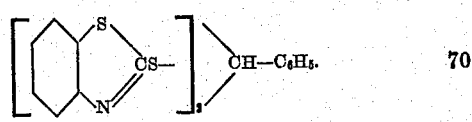

20. As a new compound a benzothiazyl sulphide containing the group

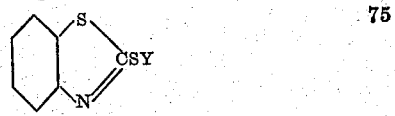

where Y consists of a phenyl group and at least one acidic substituent.

21. As a new compound a benzothiazyl sulphide containing the group

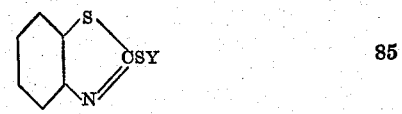

where Y respresents a polynitrophenyl group.

22. As a new compound a benzothiazyl sulphide containing the group

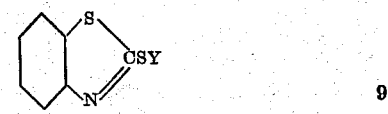

where Y represents a picryl group.

23. As a new compound 2, 4, 6-trinitrophenyl benzothiazyl sulphide.

24. A process of making compounds of the kind set forth in claim 16 which comprises treating a salt of the thiazole with the chloride of the substituted aromatic group of the benzene series.

25. A process of making compounds of the kind set forth in claim 17 which comprises treating a salt of the thiazole with the chloride of the substituted phenyl group.

Signed at New York, county and State of New York, this 23rd day of February, 1928.

SIDNEY M. CADWELL.